United States Patent
Reich et al.

(10) Patent No.: US 6,910,960 B2
(45) Date of Patent: Jun. 28, 2005

(54) HAND MACHINE-TOOL COMPRISING A DUST EXTRACTION DEVICE

(75) Inventors: Doris Reich, Stuttgart (DE); Steffen Wuensch, Holzgerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 10/399,302

(22) PCT Filed: Jul. 10, 2002

(86) PCT No.: PCT/DE02/02570

§ 371 (c)(1),
(2), (4) Date: Apr. 15, 2003

(87) PCT Pub. No.: WO03/026848

PCT Pub. Date: Apr. 3, 2003

(65) Prior Publication Data

US 2004/0002296 A1 Jan. 1, 2004

(30) Foreign Application Priority Data

Sep. 13, 2001 (DE) ........................................ 101 45 040

(51) Int. Cl.[7] ................................................ B24B 5/00
(52) U.S. Cl. ........................ 451/451; 451/456; 451/358; 451/359
(58) Field of Search ................................ 451/451, 453, 451/456, 344, 358, 359

(56) References Cited

U.S. PATENT DOCUMENTS

| | | | | |
|---|---|---|---|---|
| 1,792,313 A | * | 2/1931 | La Measure et al. ............ | 15/23 |
| 2,379,503 A | * | 7/1945 | Teager ........................ | 451/456 |
| 2,723,513 A | * | 11/1955 | Slonneger .................... | 451/178 |
| 4,402,716 A | * | 9/1983 | Chiaramonte ................. | 55/356 |
| 4,627,129 A | * | 12/1986 | Wittes ........................ | 15/244.4 |
| 4,841,929 A | * | 6/1989 | Tuggle et al. ............ | 123/198 E |
| 4,967,516 A | * | 11/1990 | Hoshino et al. ............. | 451/359 |
| 5,113,951 A | * | 5/1992 | Houben et al. ............... | 173/75 |
| 5,237,781 A | * | 8/1993 | Demetrius ................... | 451/456 |
| 5,419,737 A | * | 5/1995 | Brazell et al. .............. | 451/453 |
| 5,518,442 A | * | 5/1996 | Clowers et al. ............. | 451/359 |
| 5,795,216 A | * | 8/1998 | Graves ........................ | 451/456 |
| 5,878,607 A | * | 3/1999 | Nunes et al. ................. | 30/124 |
| 5,951,388 A | * | 9/1999 | Parsons ....................... | 451/451 |
| 6,224,471 B1 | | 5/2001 | Clowers | |
| 6,315,647 B1 | * | 11/2001 | Ghilardi ....................... | 451/75 |
| 6,514,131 B1 | * | 2/2003 | Reich et al. ................ | 451/344 |
| 6,571,838 B1 | * | 6/2003 | Chiang ..................... | 144/252.1 |

FOREIGN PATENT DOCUMENTS

| | | | |
|---|---|---|---|
| DE | 38 27 150 C | 6/1989 | |
| EP | 000558253 A1 | * 2/1992 | .......... B24B/55/10 |
| GB | 2 343 393 A | 5/2000 | |
| WO | 01 45545 A | 6/2001 | |

* cited by examiner

Primary Examiner—M. Rachuba
(74) Attorney, Agent, or Firm—Michael J. Striker

(57) ABSTRACT

A hand power tool (10), in particular with integrated dust removal, that comprises a housing (12) on which a dust tube (22) is mounted that is capable of being interconnected with a dust box (24) by means of its dust inlet connection piece (26), whereby a side wall (27) of the dust box (24) has through holes (25) that are reached over by a filter in dust-tight fashion, becomes less expensive and more environmentally friendly by the fact that the filter (30, 31, 32, 33, 34, 35, 36, 37, 38, 300) is formed by a flat sheet composed of a fine-pored material, the surface area of which is increased by means of certain structures.

4 Claims, 5 Drawing Sheets

HAND MACHINE-TOOL COMPRISING A DUST EXTRACTION DEVICE

BACKGROUND OF THE INVENTION

The invention is based on a hand power tool according to the general description of claim 1.

A hand power tool is made known in GB 2,343,393 that has a dust box that enables dust removal with high efficiency and minimal emission of fine dust.

The suction of the known hand power tool is created by a ventilator rotating with the drive motor of the hand power tool.

The dust box provided for collecting the sanding/grinding dust is equipped with a fluted filter or a microfilter composed of cellulose. Said filter is sensitive to moisture and cannot be cleaned once it reaches a certain level of contamination, and certainly not in water and/or solvents. It is therefore not reusable.

The fluted filter can only be cleaned together with the cover in which it is installed. If it can no longer be cleaned, the fluted filter must be discarded with the cover and replaced with a new cover having a cleaned filter

ADVANTAGES OF THE INVENTION

The hand power tool according to the invention having the features of claim 1 has the advantage that the efficiency of dust removal at the hand power tool is improved and the emission of fine dust, which is low anyway, is reduced even further.

Due to the fact that the filter sheet is located in the interior of the dust box on the side closest to the work piece to be worked, the sanding/grinding dust covering said filter sheet increases the filtering effect without reducing the efficiency of dust removal.

Due to the fact that the side of the dust box facing the work piece is designed as a cover inside which the filter sheet is installed, the filter sheet—once the cover is removed—can be cleaned particularly easily using a brush or by tapping on it; in particular, it can be washed conveniently and thoroughly in water or other solvents.

Due to the fact that the dust box is interconnected with the hand power tool at only one location, i.e., at the dust tube, and is therefore capable of being held in place in captive fashion, further fastening means are unnecessary, and the dust box can be detached and removed from the hand power tool more quickly and conveniently than with previously known dust boxes.

Due to the fact that the filter sheet is fastened to the cover of the dust box in detachable fashion, it is particularly easy to clean and replace with cleaned filter sheets for reuse.

SUMMARY OF THE DRAWINGS

The invention is described hereinbelow with reference to associated drawings.

DESCRIPTION OF THE PREFERRED EMBODIMENTS

Figure 1:
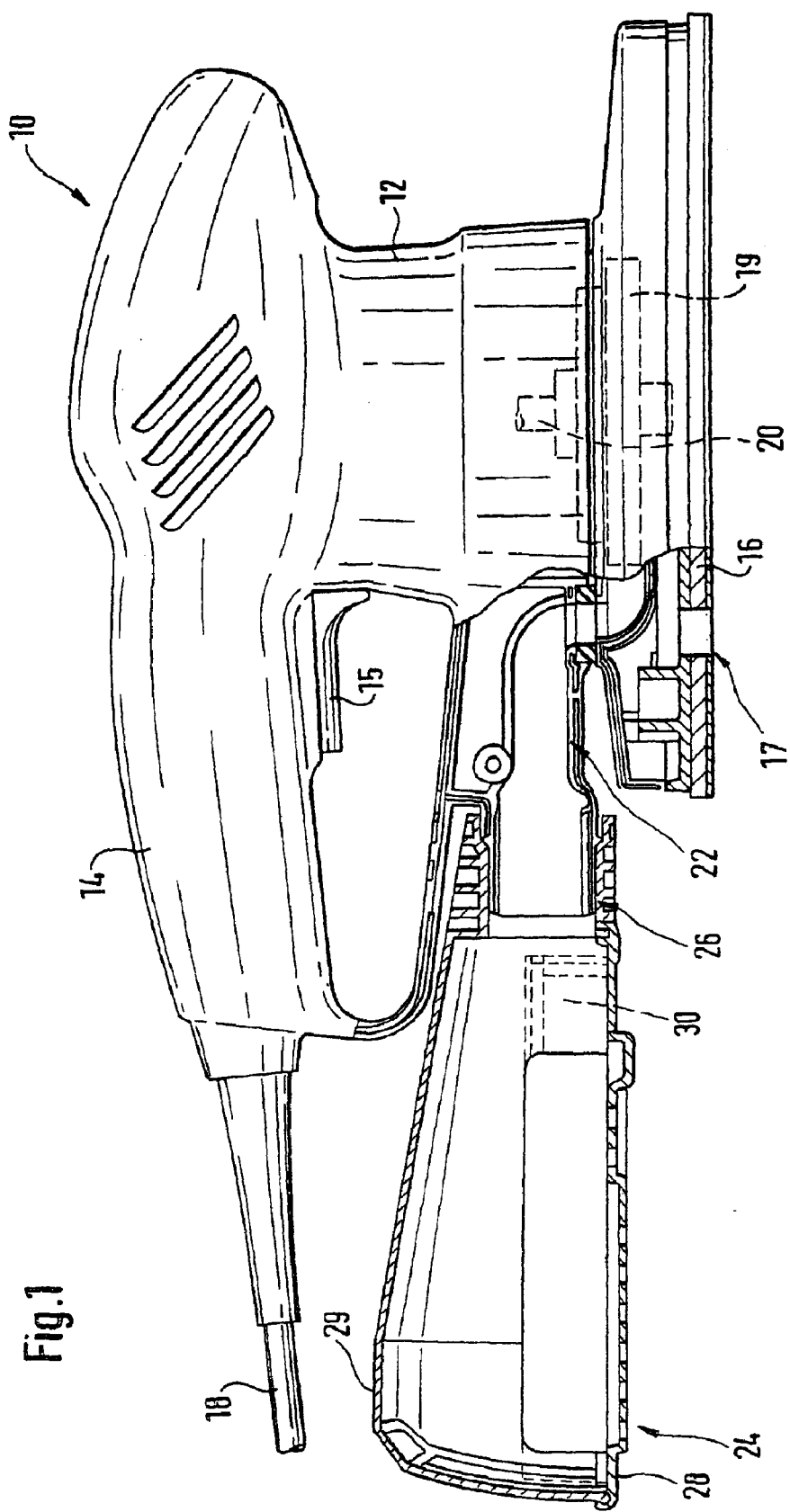
FIG. 1 is a side sectional detail view of the hand power tool with dust box.

FIG. 1 shows the side view of a hand power tool 10 designed as oscillating sander. It comprises a housing 12 that has a handle 14 on the top that extends to the left as viewed in the drawing, and that comprises, on its underside, a switching key 15 of a not-further-described switch. With the switching key 15, a not-further-described motor equipped with a motor shaft 20 in the interior of the housing 12 is capable of being connected to a voltage source for power supply.

When the switching key 15 is operated, the motor shaft 20 of the motor rotates and, along with said motor shaft, a ventilator 19 that suctions sanding dust collecting under the sanding disc 16 from the not-shown work piece and blows it through the dust tube 22 into a dust box 24 via its dust inlet connection piece 26. The dust box 24 is composed of four side walls 27 and a bottom 29, and it is capable of being closed in dust-tight fashion with a fitted cover 28. A filter sheet 30 composed of a porous, fine-pored filter material is mounted on the cover 28 on its side facing the interior of the dust box 24. The filter sheet 30 is capable of being detached from the cover 26 in non-destructive fashion, and it can be easily replaced with a new or cleaned filter sheet. The cover 28 is therefore continuously reusable.

The dust box 24 is interconnected with the hand power tool 10 in such a fashion that the dust inlet connection piece 26 is pushed onto the dust tube 22 axially until it stops. The cover 28 of the dust box 24 faces downward as viewed in the drawing toward a not-shown work piece.

Figure 2:
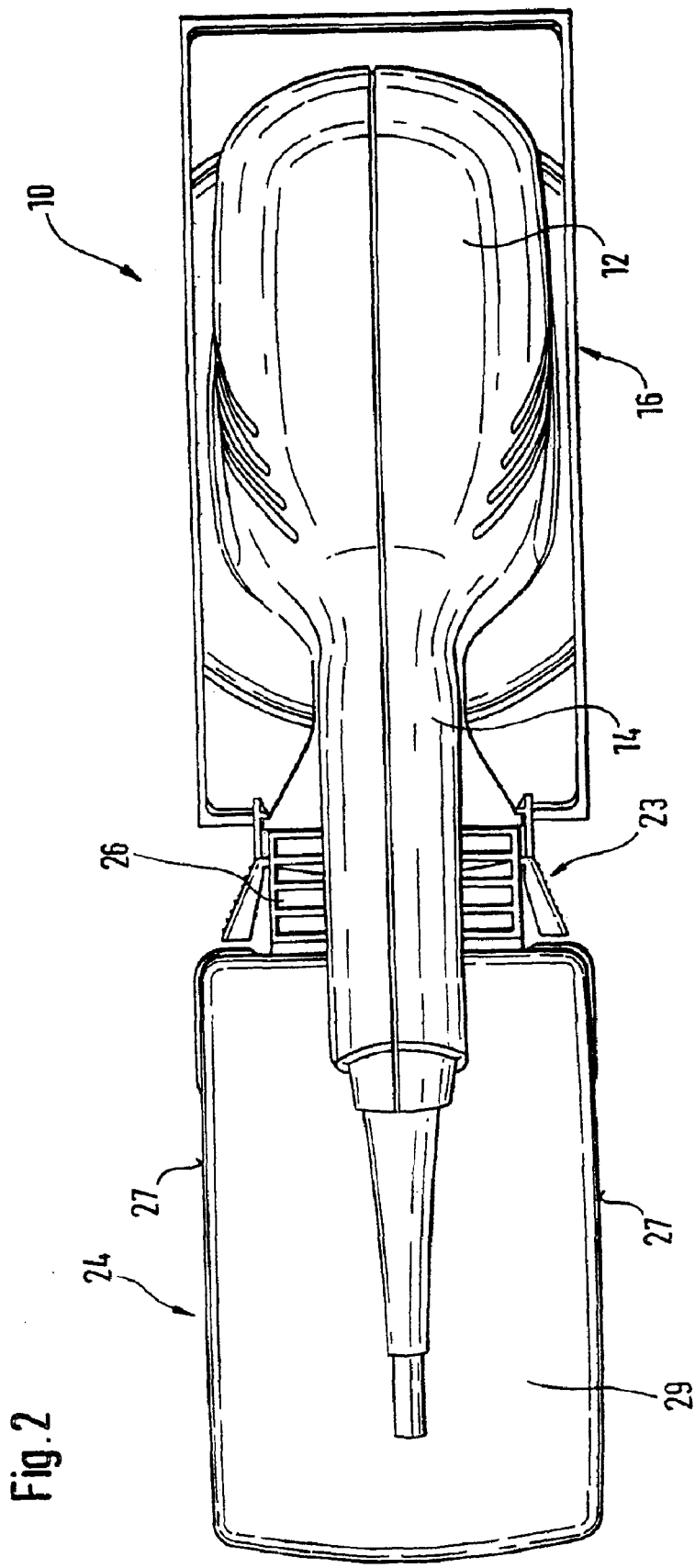
FIG. 2 is a top view of the hand power tool according to FIG. 1.

FIG. 2 is a top view of the hand power tool 10 with dust box 24 according to FIG. 1 in which the locking system 23 for latching the dust box 24 tightly to the dust tube 22 of the hand power tool 10 in captive fashion is shown particularly clearly. The locking system 23 is composed of not-further-shown pivoted levers that latch onto the dust tube 22 when the dust box 24 is joined with the housing 12 of the hand power tool 10, and they hold the dust box 24 captive on the housing 12.

Figure 3:
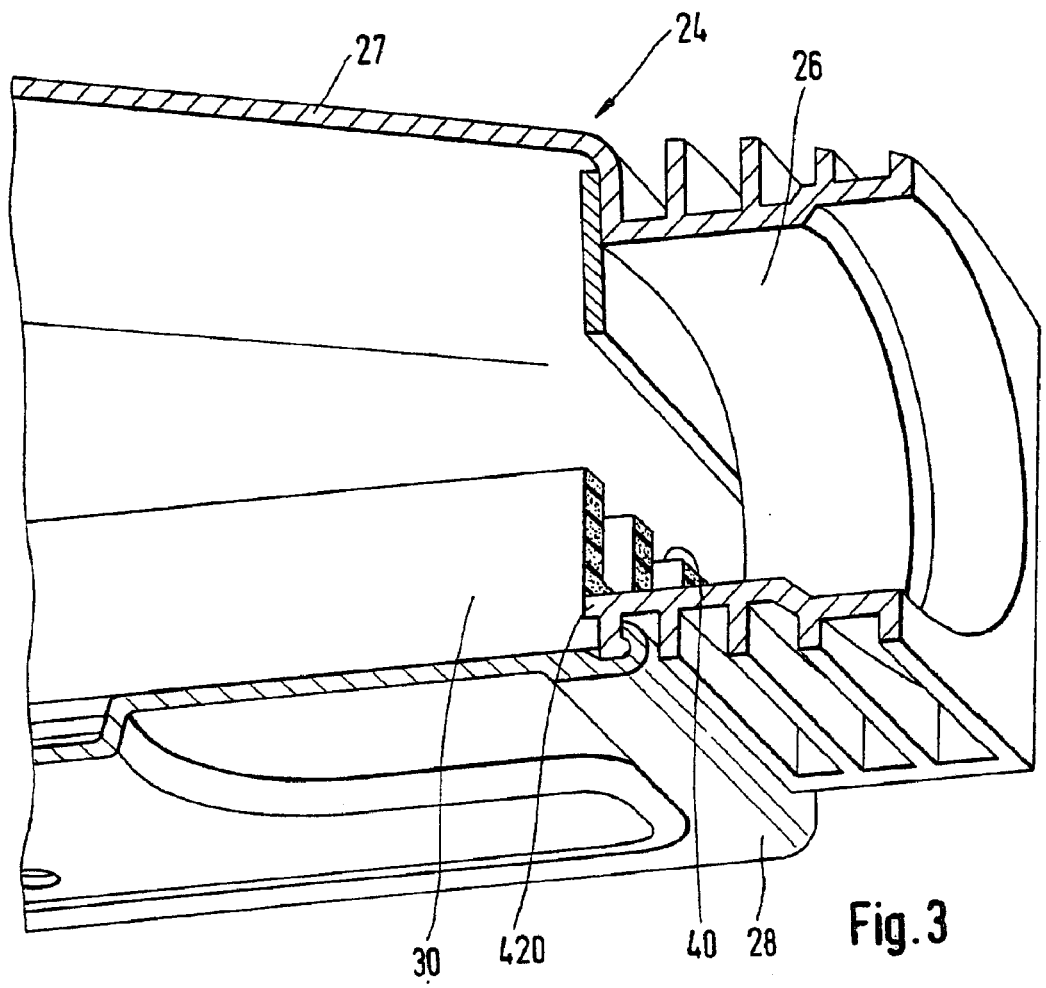
FIG. 3 is a longitudinal sectional detail view of the dust box with replaceable filter sheet.
Figure 6:
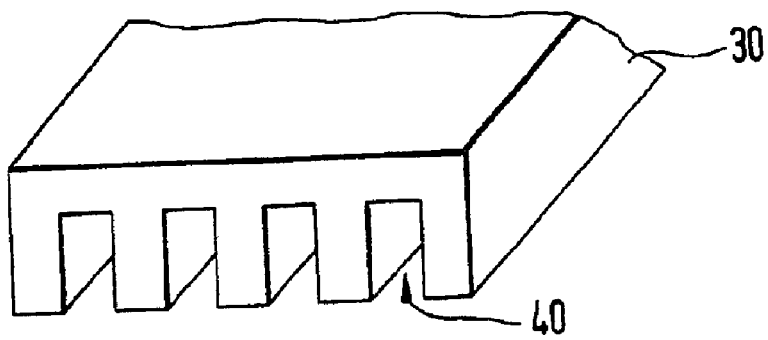

FIG. 3 is an enlarged longitudinal sectional detail view of the dust box 24, in the cover 28 of which the detachable filter sheet 30 is installed. The surface area of the side of said filter sheet that faces the interior of the dust box 240 is increased by means of rectangular grooves 40. The grooves 40 form a comb-like profile (FIG. 6).

After the cover 28 is removed from the dust box 24, the dirty filter sheet 30 can be separated non-destructively from the cover 28 and then cleaned. A replacement filter sheet 30 is then placed on the cover 28. Said cover is then clipped onto the side walls 27 via its snap-in connection. As a result, the filter sheet 30 is held tightly between the cover 28 and the side walls 27 of the dust box 24. The back side of said filter sheet bears against the cover 28, and parts of its front side bear against step-like projections 420 of the side walls 27. It is clamped in captive, dust-tight fashion.

Figure 4:
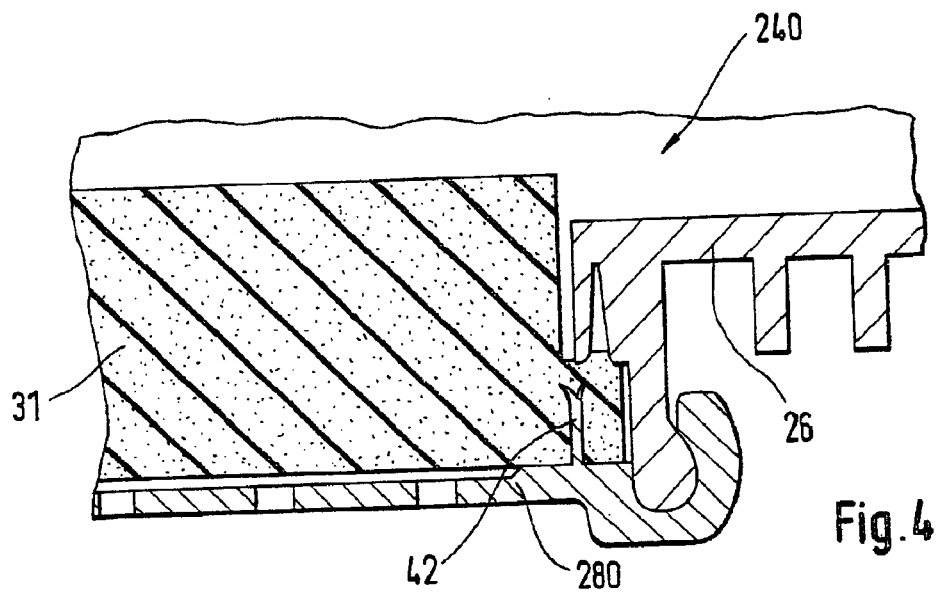
FIG. 4 is a longitudinal sectional detail view of the dust box with non-detachable filter sheet.

FIG. 4 is an enlarged longitudinal sectional detail view of a dust box 240 in which, in contrast to the dust boxes in FIGS. 1 through 3, a captively-held filter sheet 31 that cannot be detached in non-destructive fashion is installed, and that is snapped in place in peg spikes 42. The tips of the peg spikes 42 spread apart in the shape of a vee and hold the filter sheet 31 captive on the cover 280.

Figure 5:
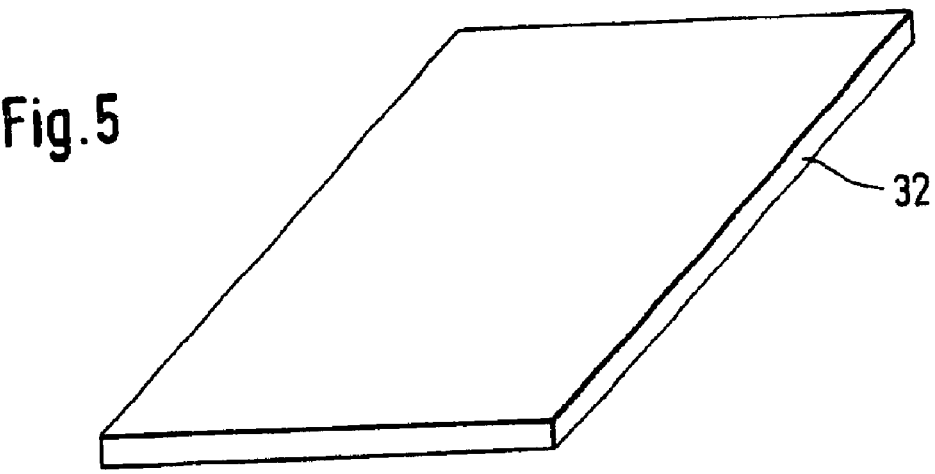
FIGS. 5 through 11 show various exemplary embodiments of profiled filter sheets.

FIG. 5 shows a flat sheet filter 32. FIG. 6 shows a filter sheet 300 having a comb profile formed by rectangular grooves 40.

Figure 7:
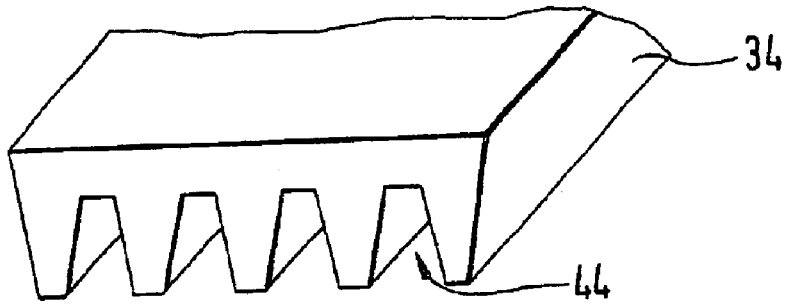

FIG. 7 shows a filter sheet 34, the cross section of which has a toothlike profile formed by recesses 44 designed in the shape of a truncated cone.

Figure 8:
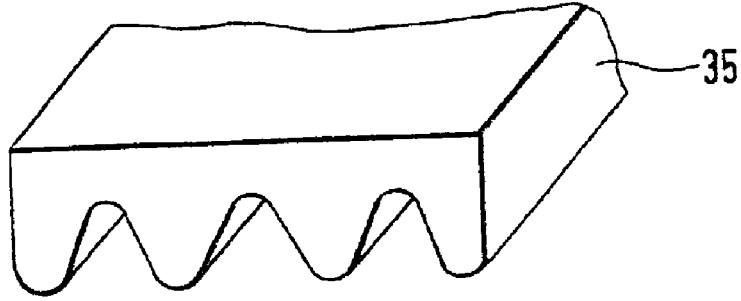

FIG. 8 shows a filter sheet 35 having a sinusoidal cross-sectional profile.

Figure 9:
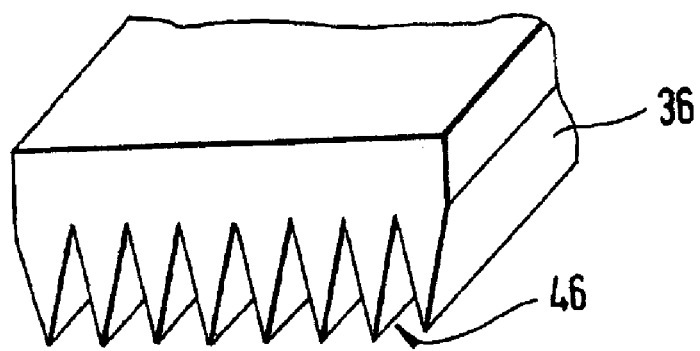
Figure 10:
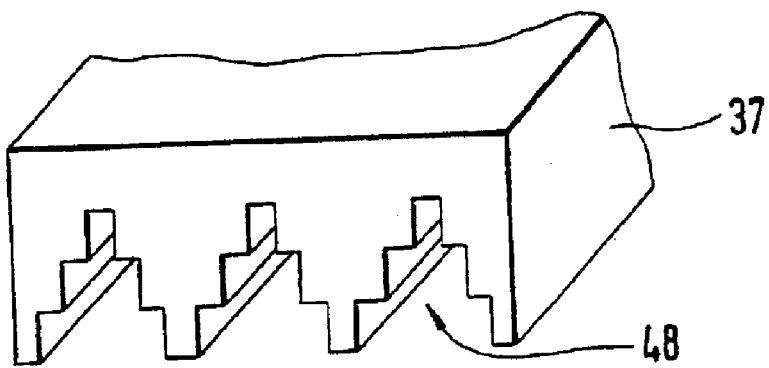

FIG. 9 shows a filter sheet 36 having vee-shaped grooves 46. FIG. 10 shows a filter sheet 37 having stepped, longitudinal grooves 48 that result in a Christmas tree-shaped profile and that markedly increase the surface area of the filter sheet 37.

Figure 11:
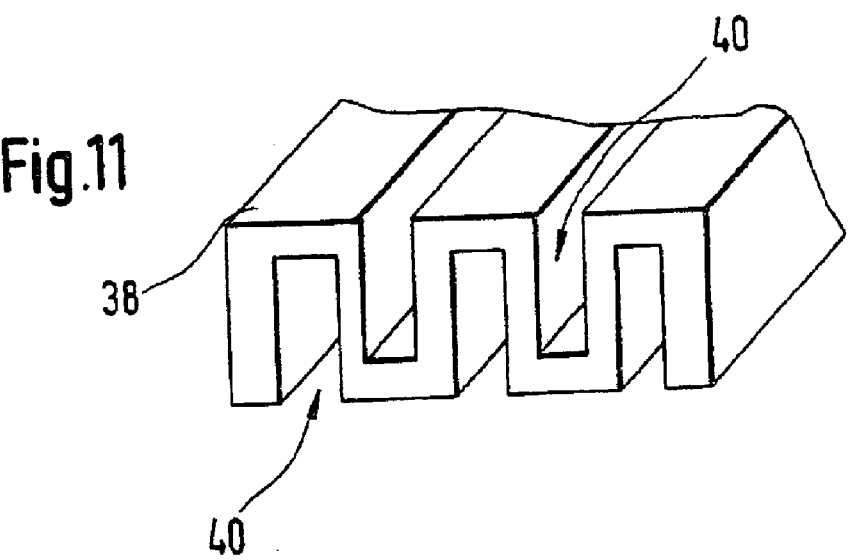

FIG. 11 shows a filter sheet 38 with rectangular grooves formed on both sides in alternating fashion that form a cross-sectional profile of the filter sheet 38 that has a meandering shape.

What is claimed is:

1. A hand power tool (10) with integrated dust removal, comprising:
    a housing (12) on which a dust tube (22) is mounted that is capable of being interconnected with a dust box (24) by means of its dust inlet connection piece (26), whereby a side wall (27) of the dust box (24) has through holes (25) that are reached over by a filter in dust-tight fashion,
    wherein the filter (30, 31, 32, 33, 34, 35, 36, 37, 38, 300) is formed by a flat sheet composed of a fine-pored material, wherein the surface area of the flat sheet is increased by means of uneven structures, wherein a cover (28) is mounted on the dust box (24), wherein the cover has through holes (25) and wherein the filter (37) is installed on an inside of the cover, wherein the filter (30, 31, 32, 33, 34, 35, 36, 37, 38, 300) is interconnected in replaceable fashion with the dust box (24), wherein the filter (30, 31, 32, 33, 34, 35, 36, 37, 38, 300) is composed of material that is resistant to water and/or solvents, wherein said filter is washable, wherein the fine-pored material is foam, and wherein the uneven structures are indentations.

2. The hand power tool according to claim 1, wherein the dust box is mounted only on the dust tube (22) of the hand power tool.

3. The hand power tool according to claim 1, wherein the filter is interconnected in replaceable fashion with the cover (28).

4. The hand power tool according to claim 1, wherein the cover (28) is mounted on the dust box (24) on an underside of the dust box, such that the cover is facing downward during use of the tool.

* * * * *